United States Patent [19]

Mani et al.

[11] Patent Number: 4,636,289

[45] Date of Patent: Jan. 13, 1987

[54] SOLUTION MINING OF SODIUM MINERALS WITH ACIDS GENERATED BY ELECTRODIALYTIC WATER SPLITTING

[75] Inventors: Krishnamurthy N. Mani, Denville; Frederick P. Chlanda, Rockaway, both of N.J.

[73] Assignee: Allied Corporation, Morris Township, Morris County, N.J.

[21] Appl. No.: 490,945

[22] Filed: May 2, 1983

[51] Int. Cl.[4] .............................................. B01D 13/02
[52] U.S. Cl. .............................. 204/182.4; 204/301; 423/206 T
[58] Field of Search ............... 204/180 P, 301, 182.4; 423/206 T; 299/5

[56] References Cited

U.S. PATENT DOCUMENTS

| | | | |
|---|---|---|---|
| 3,184,287 | 5/1965 | Gancy | 423/198 |
| 4,238,305 | 12/1980 | Gancy et al. | 204/108 P |
| 4,391,680 | 7/1983 | Mani et al. | 204/180 P |
| 4,486,283 | 12/1984 | Tejeda | 204/301 |
| 4,498,706 | 2/1985 | Ilardi et al. | 299/5 |
| 4,584,077 | 4/1986 | Chlanda et al. | 204/182.4 |

Primary Examiner—John F. Niebling
Assistant Examiner—B. J. Boggs, Jr.
Attorney, Agent, or Firm—Gus T. Hampilos; Gerhard H. Fuchs

[57] ABSTRACT

A process employing two- and three-compartment electrodialytic water splitting for conversion of basic sodium material such as dry-mined or subterranean deposits of trona or nahcolite into a liquid comprising aqueous sodium base such as NaOH and/or $Na_2CO_3$. The basic sodium material is contacted with a liquid comprising aqueous hydrogen ions for a time sufficient to produce a liquid comprising aqueous sodium ions. A liquid comprising water is introduced into each base compartment and the liquid comprising aqueous sodium ions is introduced into each remaining compartment of a two- or three-compartment water splitter. Direct current is passed through said water splitter to produce, a liquid comprising an aqueous sodium base in the base compartment and a liquid comprising aqueous hydrogen ions in an acid compartment of said water splitter. At least a portion of the liquid comprising aqueous hydrogen ions is used in the initial contacting step. In preferred embodiments, a subterranean deposit of trona is solution mined with a $Na_2SO_4/H_2SO_4$ solution thereby converting the trona into $CO_2$ and an aqueous solution (reaction liquid) of $Na_2SO_4$, optionally containing $NaHCO_3$, which is pumped to the surface and supplied to a water splitter to wherein a $Na_2SO_4/H_2SO_4$ solution is regenerated and aqueous NaOH is produced. The regenerated $Na_2SO_4/H_2SO_4$ may be reinjected into the trona deposit and the NaOH may be concentrated or optionally used to convert trona into soda ash.

13 Claims, 10 Drawing Figures

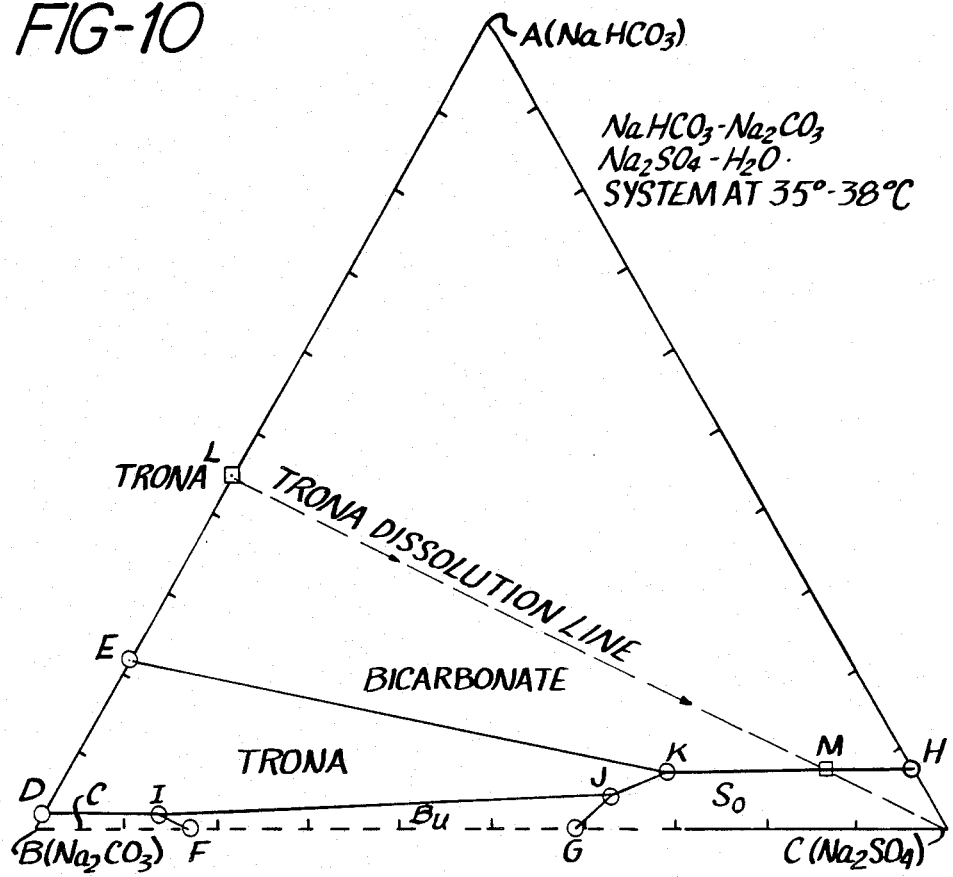

FIG-10

$NaHCO_3$-$Na_2CO_3$-$Na_2SO_4$-$H_2O$ SYSTEM AT 35°-38°C

NOTATION: $C_1$ = $Na_2CO_3 \cdot H_2O$
$B_u$ = $Na_2CO_3 \cdot 2Na_2SO_4$
$S_o$ = $Na_2SO_4$

| POINT | SOLID PHASE | COMPOSITION, ($NaHCO_3$, $Na_2CO_3$, $Na_2SO_4$) |
|---|---|---|
| A | $NaHCO_3$ | (10.6, 0, 0) |
| B | $C_1$ | (0, 33.7, 0) |
| C | $S_o$ | (0, 0, 33.2) |
| D | $C_1$ + TRONA | (0.6, 32.5, 0) |
| E | TRONA + BICARBONATE | (4.7, 17.3, 0) |
| F | $C_1$ + $B_u$ | (0, 28.7, 5.98) |
| G | $B_u$ + $S_o$ | (0, 14.3, 20.6) |
| H | $S_o$ + BICARBONATE | (2.43, 0, 30.88) |
| I | $C_1$ + $B_u$ + TRONA | (0.44, 29.49, 4.49) |
| J | $B_u$ + TRONA + $S_o$ | (1.5, 12.13, 21.31) |
| K | TRONA + $S_o$ + BICARBONATE | (2.43, 9.0, 22.10) |
| L | BICARBONATE | SOLID TRONA |
| M | $S_o$ + BICARBONATE | (2.43, 3.06, 27.91) |

SOLUTION MINING OF SODIUM MINERALS WITH ACIDS GENERATED BY ELECTRODIALYTIC WATER SPLITTING

BACKGROUND OF THE INVENTION

This invention relates to recovery of aqueous sodium base from sodium minerals by contacting sodium minerals such as dry-mined or underground deposits of trona with aqueous acid generated by two- or three-compartment electrodialytic water splitting. More particularly, the invention relates to acid solution mining of subterranean deposits of sodium minerals such as trona or nahcolite to produce an aqueous solution of sodium ions which is subjected to two- or three-compartment electrodialytic water splitting to produce an aqueous hydrogen ion-enriched solution which is recycled to the subterranean deposit, and an aqueous sodium base which may be concentrated for sale or optionally may be used to convert sodium minerals such as trona or nahcolite into soda ash via caustic solution mining and processing or above-ground processing of dry-mined sodium minerals.

Most soda ash (sodium carbonate) produced in the United States is obtained from naturally occurring subterranean trona ore deposits located in southwestern Wyoming. Trona ore consists mainly of sodium sesquicarbonate. $Na_2CO_3 \cdot NaHCO_3 \cdot 2H_2O$, a hydrated sodium carbon-ate, sodium bicarbonate double salt, and normally con-tains 4-13% insoluble impurities. A typical analysis of the crude trona is:

|  | Percent |
|---|---|
| $Na_2CO_3$ | 41.8 |
| $NaHCO_3$ | 33.1 |
| $H_2O$ | 14.1 |
| $NaCl$ | 0.04 |
| $Na_2SO_4$ | 0.01 |
| Iron | 0.08 |
| Water insolubles | 10.87 |

The composition of the crude trona corresponds quite closely to that of pure sodium sesquicarbonate except for the impurities present. Shale stringers or beds, present throughout the trona bed, can alter the amount of impurities in different parts of the trona bed.

At the present time, trona deposits are normally mechanically (dry) mined and converted to soda ash by either the sesquicarbonate process or the monohydrate process [the features of which are summarized in U.S. Pat. No. 3,528,766 (Coglaiti et al)]. In the sesquicarbonate process, the trona ore is dissolved in hot aqueous alkali solution and, after separation of the resulting solution from the insolubles, sodium sesquicarbonate is crystallized from solution by cooling. The sesquicarbonate crystals are separated from the mother liquor and then calcined to recover soda ash (anhydrous sodium carbonate). In the monohydrate process, the dry-mined trona ore is first calcined to convert its bicarbonate content to sodium carbonate which is then dissolved in water. After the resulting solution is separated from the insolubles, sodium carbonate monohydrate is precipitated by evaporative crystallization. The monohydrate crystals are separated from the mother liquor and dried to recover soda ash.

Recently, solution mining techniques have been utilized as an alternative to mechanical (dry) mining to recover soda ash from subterranean trona ore deposits. Solution mining of subterranean trona deposits by use of hot water, and various alkaline solutions is well known. For example, U.S. Pat. No. 2,388,009 (Pike) discloses the use of a hot water or hot carbonate solution as the mining fluid. See also U.S. Pat. Nos. 2,625,384 (Pike et al.), 2,847,202 (Pullen); 2,979,315 (Bays); 3,018,095 (Redlinger); 3,050,290 (Caldwell et al.); 3,086,760 (Bays); 3,405,974 (Handley et al) and 4,288,419 (Copenhafer et al.). Solution mining of subterranean trona deposits by the use of aqueous sodium hydroxide is disclosed by U.S. Pat. Nos. 3,184,287 (Gancy), 3,952,073 (Kube) and 4,344,650 (Pinsky et al.). U.S. Pat. No. 4,283,372 (Frint et al.) discloses the use of an aqueous ammonia solution as a mining fluid for trona. These prior art solution mining processes, however, involve substantial energy inputs in manufacturing sodium hydroxide, manufacturing and recycling ammonia, supplying high temperature mining solution, and calcining one or more intermediates.

In addition to trona, nahcolite (predominantly $NaHCO_3$) and wegscheiderite (predominately $Na_2CO_3 \cdot 3NaHCO_3$) are sodium bicarbonate-containing ores from which it is possible to recover soda ash, after conversion of the bicarbonate to carbonate. Known deposits of nahcolite and wegscheiderite are located primarily in Utah and Colorado. No commercial operations are presently known to be recovering soda ash from these $NaHCO_3$-bearing minerals. However, various U.S. patents disclose solution mining of nahcolite. See, for example, U.S. Pat. Nos. 3,779,602 (Beard et al.) and 3,792,902 (Towell et al.), as well as 3,952,073 (Kube) and 4,283,372 (Frint et al.) which disclose basic solution mining of nahcolite and wegscheiderite.

Electrodialysis, as disclosed in U.S. Pat. No. 3,475,122, can be used to produce acid and base from salt and water. Such a process generates $H^+$ and $OH^-$ ions only at the electrodes and, at the same time, generates $H_2$ and $O_2$ (or other electrode oxidation and reduction products). Thus, each equivalent of $H^+$ and $OH^-$ generated results in an equivalent amount of $H_2$ and $OH^-$ (or other oxidation and reduction products) being produced.

Electrodialytic water splitting is another method for generating acid and base from salt and water. With a water splitting process, $H^+$ and $OH^-$ ions can be generated from each of several bipolar membranes arranged between the electrodes without forming $H_2$ and $O_2$ at the membrane faces (relatively limited quantities of $H_2$ and $O_2$ are formed at the electrodes where oxidation-reduction is taking place). Therefore, electrodialytic water splitting oxidation-reduction products are formed in only small amounts relative to the total amount of hydrogen and hydroxyl ions formed. Consequently, the process of electrodialytic water splitting requires less energy than the process of electrolysis since the energy required to produce $H_2$ and $O_2$ from the water and electrolysis must be supplied in addition to the energy needed to produce hydrogen and hydroxyl ions from water.

Electrodialytic water-splitting processes have been employed in the prior art to recover valuable products from dilute soda streams. For example, U.S. Pat. No. 4,082,835 (Chlanda et al.) discloses an electrodialytic process which utilizes two- or three-compartment water-splitters to remove $SO_2$ from dilute gas streams by means of (a) alkaline solution scrubbing, (b) regeneration of the scrubbing solution and, (c) liberation of concentrated $SO_2$. This procedure suffers from a number of inherent disadvantages. For example, although one or more of these operations may be effected in a two-compartment water-splitter, the composition of the solutions fed to both compartments is identical. Furthermore, the basic product solutions, e.g., aqueous NaOH, $Na_2SO_3$, and $Na_2SO_4$ are mixtures and, as such, are normally recycled for further alkaline scrubbing of a $SO_2$-containing solution instead of being used in other processes wherein relatively pure products are required. Moreover, the process does not produce soda ash as a product solution. Another electrodialytic process for converting aqueous streams of trona into valuable products is described in U.S. Pat. No. 4,238,305 (Gancy and Jenczewski). In this process, dilute aqueous trona is fed to the acid compartment of an electrodialytic cell for conversion into sodium hydroxide and carbon dioxide. The sodium hydroxide and carbon dioxide products can be recovered and used separately, or combined in another reaction zone to provide soda ash. While relatively effective, this procedure also suffers from certain inherent disadvantages. For example, this process requires that $H_2CO_3/CO_2$ be generated and liberated within the acid compartment thereby increasing the electric power necessary for the electrodialytic process. In addition to the increased energy expenditures, there is also an increase in the cost and complexity of the equipment necessary for effectuating the process.

SUMMARY OF THE INVENTION

In accordance with the invention there is provided a process employing electrodialytic water splitting for converting basic sodium material into a liquid comprising aqueous hydrogen ions and a liquid comprising aqueous sodium base which comprises:

(a) contacting basic sodium material with a liquid comprising aqueous hydrogen ions for a time sufficient to produce a reaction liquid comprising aqueous sodium ions;

(b) introducing the reaction liquid and a liquid comprising water into separate compartments of an electrodialytic water splitter;

(c) passing direct current through said electrodialytic water splitter to produce a reaction liquid product comprising aqueous hydrogen ions and a liquid product comprising an aqueous sodium base;

(d) withdrawing reaction liquid product from said electrodialytic water splitter; and (e) supplying at least a portion of the withdrawn reaction liquid product for contact with the base sodium material.

In another preferred embodiment of the present invention the above described process is employed for acid solution mining of a subterranean deposit comprising basic sodium mineral to produce a liquid comprising aqueous sodium base wherein the liquid comprising aqueous hydrogen ions is contacted with a subterranean deposit comprising basic sodium mineral for a time sufficient to produce the reaction liquid which is treated in the electrodialytic water splitter.

In another preferred embodiment of the present invention, there is provided a process employing electrodialytic water splitting for acid and base solution mining of subterranean deposits of basic sodium mineral to produce a liquid comprising aqueous sodium carbonate which comprises:

(a) contacting a first subterranean deposit comprising basic sodium mineral with a liquid comprising aqueous hydrogen ions for a time sufficient to produce a reaction liquid comprising aqueous sodium ions;

(b) withdrawing from said first subterranean deposit at least a portion of the reaction liquid;

(c) introducing the withdrawn reaction liquid and a liquid comprising water into separate compartments of an electrodialytic water splitter;

(d) passing direct current through said electrodialytic water splitter to produce a liquid product comprising aqueous sodium hydroxide and reaction product comprising aqueous hydrogen ions in said electrodialytic water splitter;

(e) withdrawing and forwarding at least a portion of the reaction product for contact with the base sodium mineral;

(f) supply at least a portion of the reaction liquid product for contact with a second subterranean deposit comprising basic sodium material for a time sufficient to produce a liquid comprising aqueous sodium carbonate;

(g) withdrawing from said second subterranean deposit at least a portion of the liquid comprising aqueous sodium carbonate.

BRIEF DESCRIPTION OF THE FIGURES

FIG. 10 graphically illustrates a phase diagram for the $NaHCO_3$—$Na_2CO_3$—$Na_2SO_4$—$H_2O$ system at 35°–38° C.

DETAILED DESCRIPTION OF THE INVENTION

Figure 1:
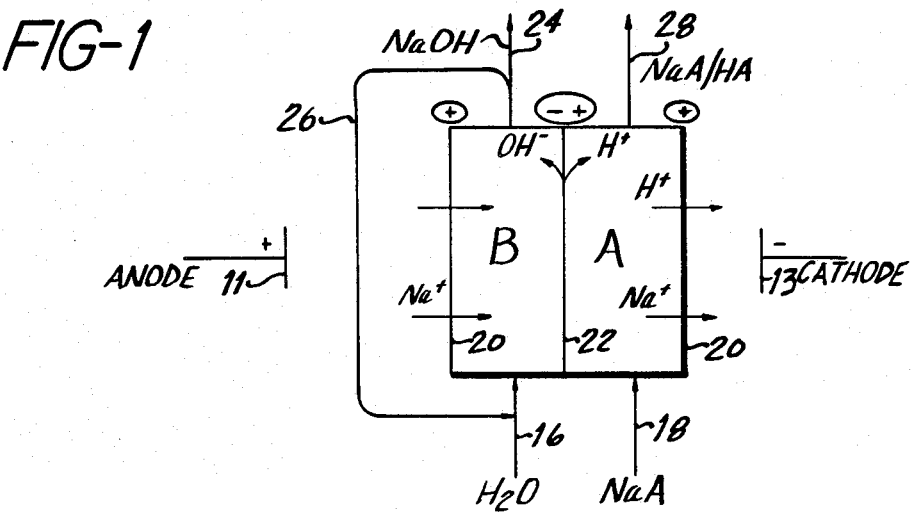
FIG. 1 illustrates the operation of a unit cell of the two-compartment electrodialytic water splitter used in the present invention.

The present invention provides an improved method for recovering useful sodium values from sodium minerals such as trona or nahcolite by contacting the sodium mineral with an aqueous solution of hydrogen ions generated in a two- or three-compartment electrodialytic water splitter. Contact of the dry-mined or subterranean trona with the aqueous solution of hydrogen ions converts the sodium carbonate and/or sodium bicarbonate into $CO_2$ and an aqueous solution of sodium ions. The aqueous solution is then supplied to a two- or three-compartment water splitter to produce an aqueous solution of hydrogen ions and aqueous sodium base such as sodium hydroxide and/or sodium carbonate. The aqueous solution of hydrogen ions is forwarded to contact the sodium mineral, and the aqueous sodium base is concentrated for sale. In a preferred embodiment, at least a portion of the sodium hydroxide is forwarded for contact sodium mineral, such as trona, to produce concentrated (about 10-32 weight %) sodium carbonate which may be converted into soda ash (anhydrous sodium carbonate) via conventional techniques well known in the prior art.

Among the aqueous solutions of hydrogen ions found useful in the process of the present invention are $H_2SO_4/Na_2SO_4$, $Na_xH_{2-x}SO_4$ (wherein x is 0 to 2), $Na_xH_{3-x}PO_4$ (wherein x is 0 to 2), HCl/NaCl, carboxylic acids (such as acetic or formic acids) and mixtures thereof. A solution comprising $Na_2SO_4$ and $H_2SO_4$ is the preferred aqueous acid. A solution of a mixture of a weak acid (e.g., acetic acid), and a strong acid (such as $H_2SO_4$) and sodium salts thereof, which would improve the efficiency of the water splitter, may also be used.

The present invention offers the following significant advantages over prior art methods, especially prior art solution mining of subterranean deposits of sodium minerals such as trona and nahcolite:

(1) the acid solution contacting step, especially with a solution comprising $Na_2SO_4$ and $H_2SO_4$, HCl or $Na_xH_{3-x}PO_4$, is chemically driven to produce an aqueous solution of sodium ions, substantially free of impurities;

(2) the acid solution contacting step takes place readily at the ambient temperature including in the subterranean deposits;

(3) the acid solution contacting step proceeds readily with both carbonates and bicarbonates (regardless of the counter cation such as $Mg^{+2}$) so that the binding of reaction surfaces, as disclosed in U.S. Pat. No. 3,184,287 (Gancy) for water solution mining of sodium bicarbonate-containing minerals such as trona, is obviated;

(4) the carbon dioxide released in a cavity of the subterranean deposit fills and pressurizes the cavity so that transportation of the acid solution mined aqueous sodium solution to the surface is readily achieved with minimal pumping requirements;

(5) calcination of the trona is eliminated; and (6) the aqueous solution of hydrogen ions is economically produced by using two- and three-compartment electrodialytic water splitters and easily recycled.

A basic sodium mineral, for example dry-mined or subterranean deposits of trona (sodium sesquicarbonate), or nahcolite (impure sodium bicarbonate) or wegscheiderite ($Na_2CO_3.3NaHCO_3$) is contacted with a liquid comprising an aqueous solution of hydrogen ions withdrawn from an acid compartment of a two or three compartment electrodialytic water splitter for a time sufficient to produce a liquid comprising aqueous sodium ions and carbon dioxide gas. The preferred aqueous solution of hydrogen ions is an aqueous solution comprising sulfuric acid and sodium sulfate, normally containing from about 1-15% by weight, preferably about 5 to 10% by weight sulfuric acid and about 5 to 30% by weight, preferably 15 to 20% by weight, of sodium sulfate. The preferred liquid com-prising sodium ions is a liquid comprising sodium sulfate and, optionally, sodium carbonate and/or sodium bicarbonate.

The acidification step when the solid basic sodium mineral is trona ($Na_2CO_3.NaHCO_3.2H_2O$) may be represented by the following equation:

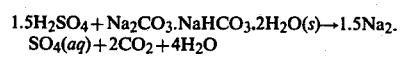

The acidification step when the solid basic sodium mineral is nahcolite ($NaHCO_3$) may be represented by the following equation:

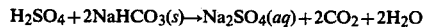

The acidification step when the solid basic sodium mineral is wegscheiderite ($Na_2CO_3.3NaHCO_3$) may be represented by the following equation:

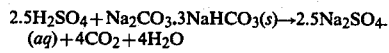

The temperature of contacting in the acidification step is normally between about 10° and 80° C., preferably 25° to 50° C., or even ambient.

The carbon dioxide gas evolved in the acidification step may be recovered or vented to the atmosphere. Additional carbon dioxide may be removed from the effluent exiting the acidification step by, for example, applying a vacuum or passing an air stream through the effluent.

The effluent from the acidification step is a liquid preferably containing about 7% by weight to saturation of sodium sulfate, more preferably about 15 to 30% by weight sodium sulfate and is purified by sedimentation, filtration, centifugation or other means to remove solids which would interfere with the operation of the electrodialytic water splitters. The effluent comprising aqueous sodium sulfate from the acidification step may be further purified by treatment with carbonate ion ($CO_3^=$) and/or ion exchange resins to remove alkaline earth metals such as calcium and magnesium ions which form insoluble hydroxides. Soluble organic materials may be removed from effluent from the acidification step by carbon absorption, ultra filtration or other techniques well known to those skilled in the art.

Figure 2:
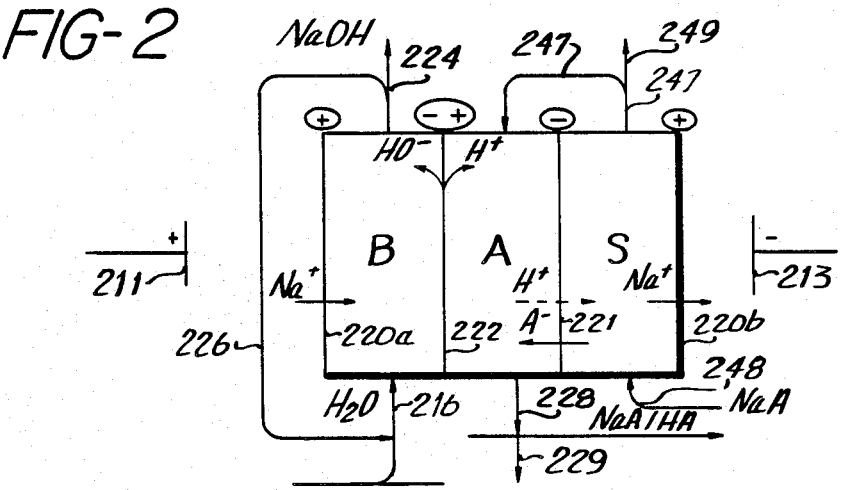
FIG. 2 illustrates the operation of a unit cell of the three-compartment electrodialytic water splitter used in the present invention.
Figure 1A:
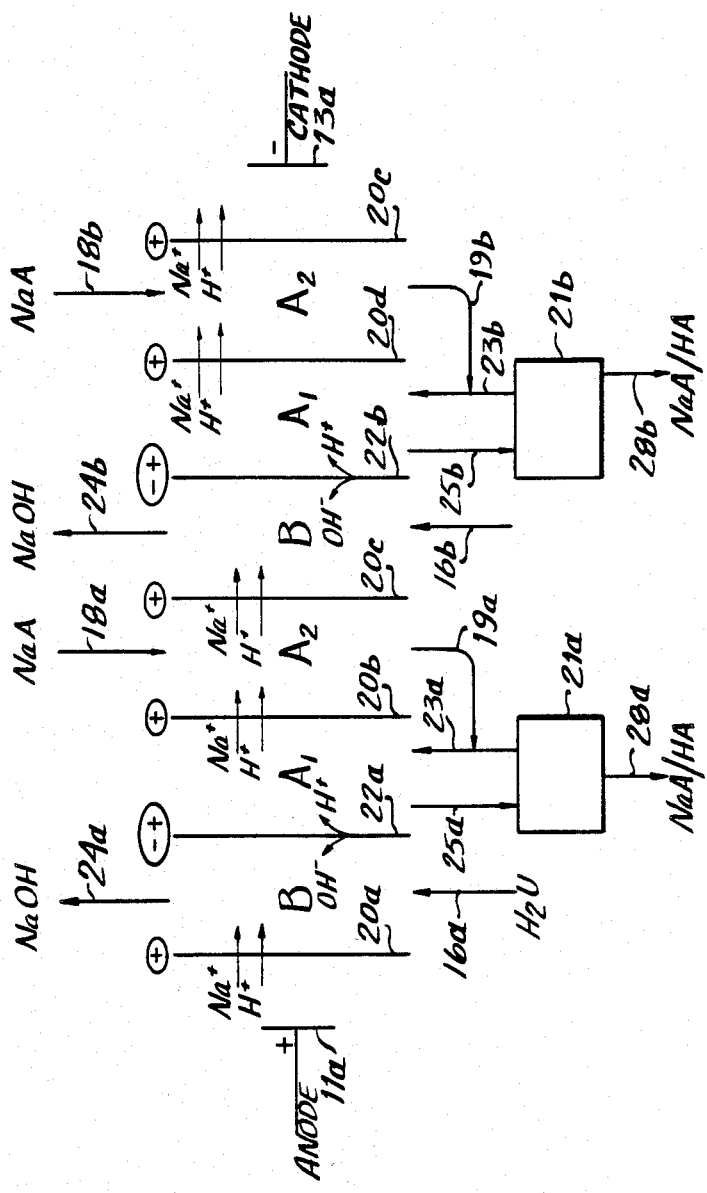
FIG. 1a illustrates the operation of two unit cells of a preferred embodiment of a two-compartment electrodialytic water splitter used in the present invention.
Figure 3:
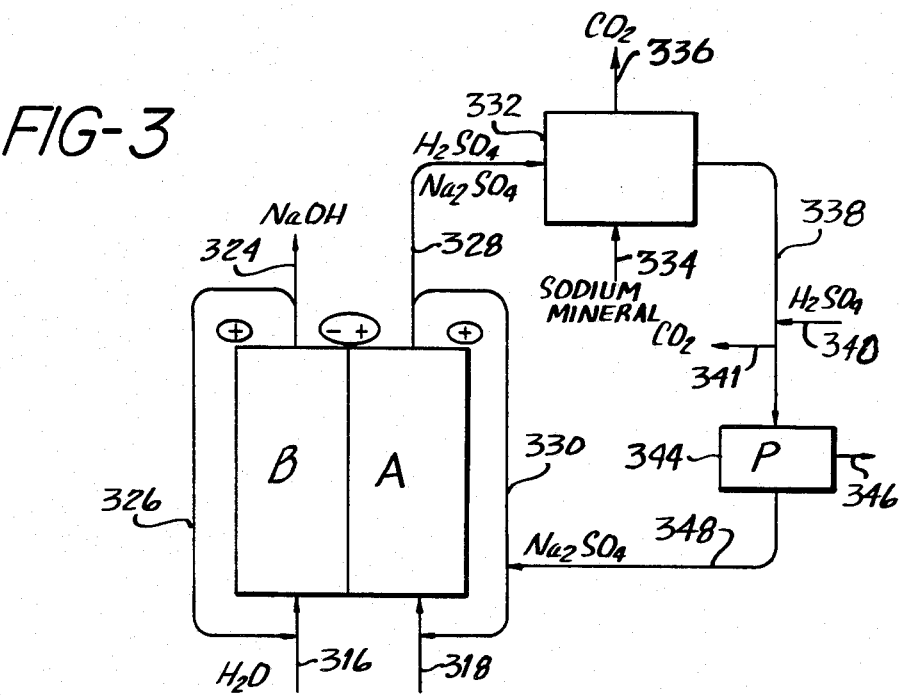
FIG. 3 illustrates a flow diagram of an embodiment of the present invention using a two-compartment electrodialytic water splitter.
Figure 4:
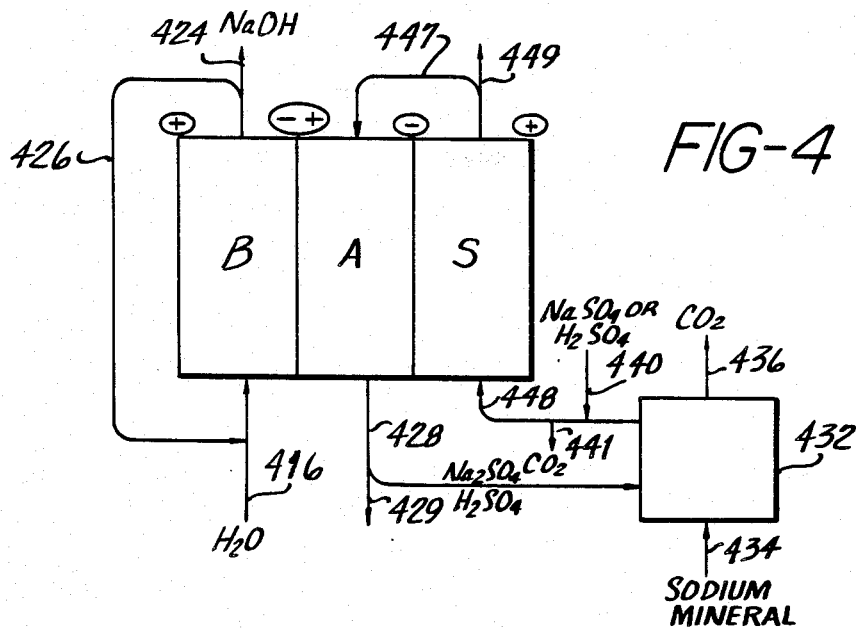
FIG. 4 illustrates a flow diagram of another embodiment of the present invention of FIG. 3 using a three-compartment electrodialytic water splitter.

The purified effluent comprising sodium sulfate is introduced into the acid compartment of a two-compartment water splitter as illustrated in FIGS. 1, 1a, and FIG. 3 or into the salt compartment of a three-compartment water splitter as is illustrated in FIGS. 2 and 4. For proper operation of two- or three-compartment water splitters, recirculation of at least a portion of the liquid comprising aqueous hydrogen ions withdrawn from the acid compartment is required to achieve a high enough flow velocity in the cell (see, for example, FIG. 3). Thus, the term "introduced into the acid compartments" as used hereinafter, means that, in addition to the direct feed to the acid compartments, the liquid comprising aqueous sodium ions may be introduced into the recirculation loop of the acid compartment of a two- or three-compartment electrodialytic water splitter. In addition, the two- and three-compartment electrodialytic water splitters may be comprised of a series of stages arranged serially to maximize the efficiency of the process of the present invention. Finally, the liquid withdrawn from the acid compartments of the two- and three-compartment water splitter and not recycled is supplied to the acidification step.

A liquid, such as water, is fed to the base compartments of the two- and three-compartment water splitters so that the liquid product contains from about 2 to about 40% by weight, preferably about 5 to 20% by weight sodium hydroxide. The sodium hydroxide withdrawn from the base compartments may be used as such or further concentrated by evaporation. If the sodium hydroxide is to be used for dissolving trona, particularly subterranean deposits of trona, the preferred concentration is about 6 to 9% by weight sodium hydroxide. When the sodium hydroxide is concentrated, the preferred concentration is about 15 to about 20% by weight sodium hydroxide. Additionally, the stream fed to the base compartment may comprise sodium carbonate (normally about 1 to about 20% by weight sodium carbonate) and/or sodium bicarbonate (normally about 1 to 9% by weight sodium bicarbonate). If sodium bicarbonate is present in the stream, the sodium bicarbonate will be converted into sodium carbonate so that the liquid product from the base compartments will contain about 2 to about 25% by weight sodium carbonate with or without sodium hydroxide. The preferred source of sodium carbonate/sodium bicarbonate for feeding to the base compartments is obtained by dissolution of solid trona, nacholite or wegscheiderite, preferably trona, or from the mother liquor obtained from a crystallizer which has been used to remove sodium bicarbonate from a trona solution. The composition of the reaction liquid product is preferably from 10 to 25% by weight sodium carbonate containing about 1.4 to 5.5% by weight sodium hydroxide. In the embodiment of the invention which includes contact of the base compartment product with the basic mineral, dissolution of solid trona in the sodium carbonate/sodium hydroxide solution will produce about a 30 to 33% by weight sodium carbonate solution (approximately a saturated solution at ambient temperature).

Figure 7:
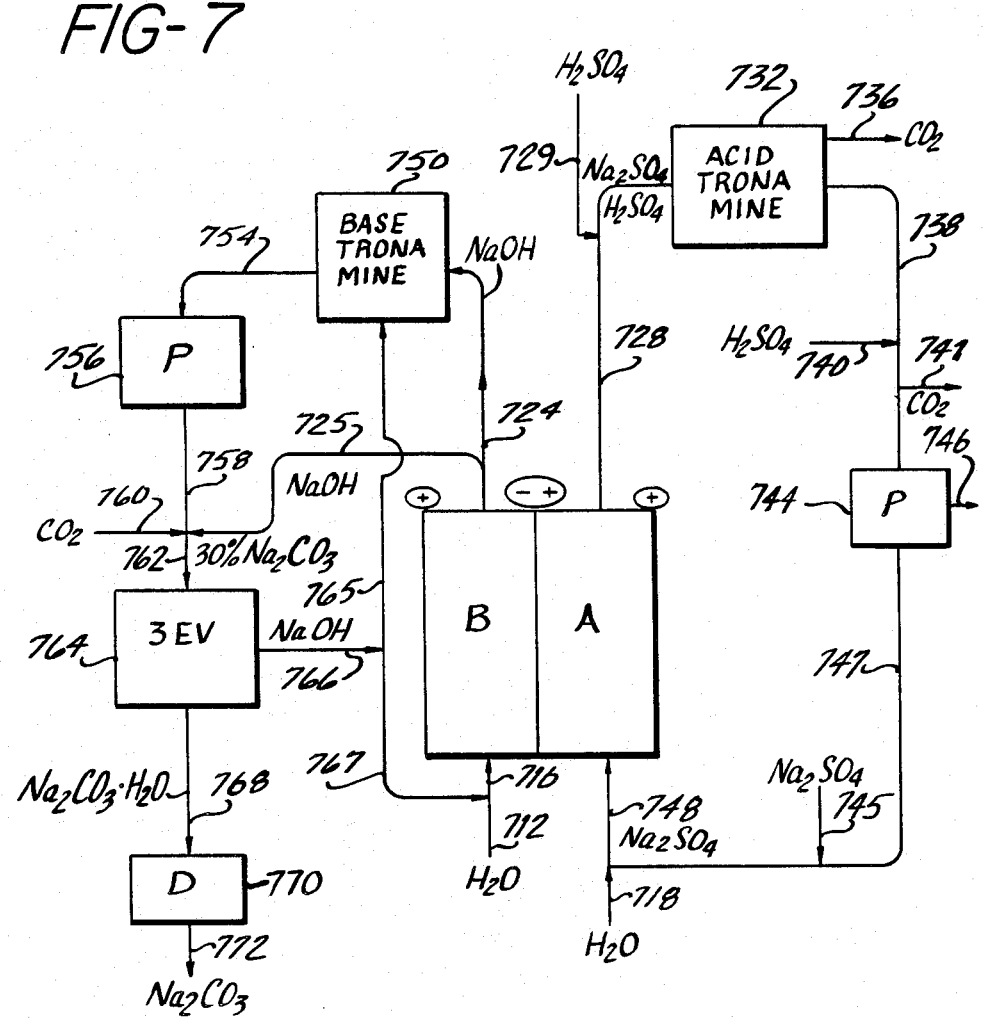
FIG. 7 illustrates a flow diagram of still another preferred embodiment of the present invention using a two-compartment electrodialytic water splitter for acid and base solution mining of subterranean trona deposits.

One embodiment of the process of the present invention contemplates acid solution mining of a subterranean trona deposit (hereinafter "acid trona mine") and is illustrated in FIG. 7. In this embodiment, sulfate is fed into the mine and some sulfate may be lost in the acid trona mine. The lost sulfate can be conveniently made up with sulfuric acid or sodium sulfate. The effluent (reaction liquid) from the acid trona mine may contain sodium bicarbonate which must be acidified to release carbon dioxide prior to forwarding to the electrodialytic water splitter. Sulfuric acid may be added to the effluent to effectively release $CO_2$. As an alternative feature of this embodiment, at least a portion of the liquid comprising aqueous hydrogen ions withdrawn from the acid compartment of a water splitter may be used to acidify the sodium bicarbonate in the effluent from the acid trona mine. The makeup sulfate is preferably added to the solution pumped to the acid trona mine in the form of sulfuric acid or may even be added to the input to the acid and/or salt compartments of the two- and three-compartment electrodialytic water splitters, respectively.

Figure 6:
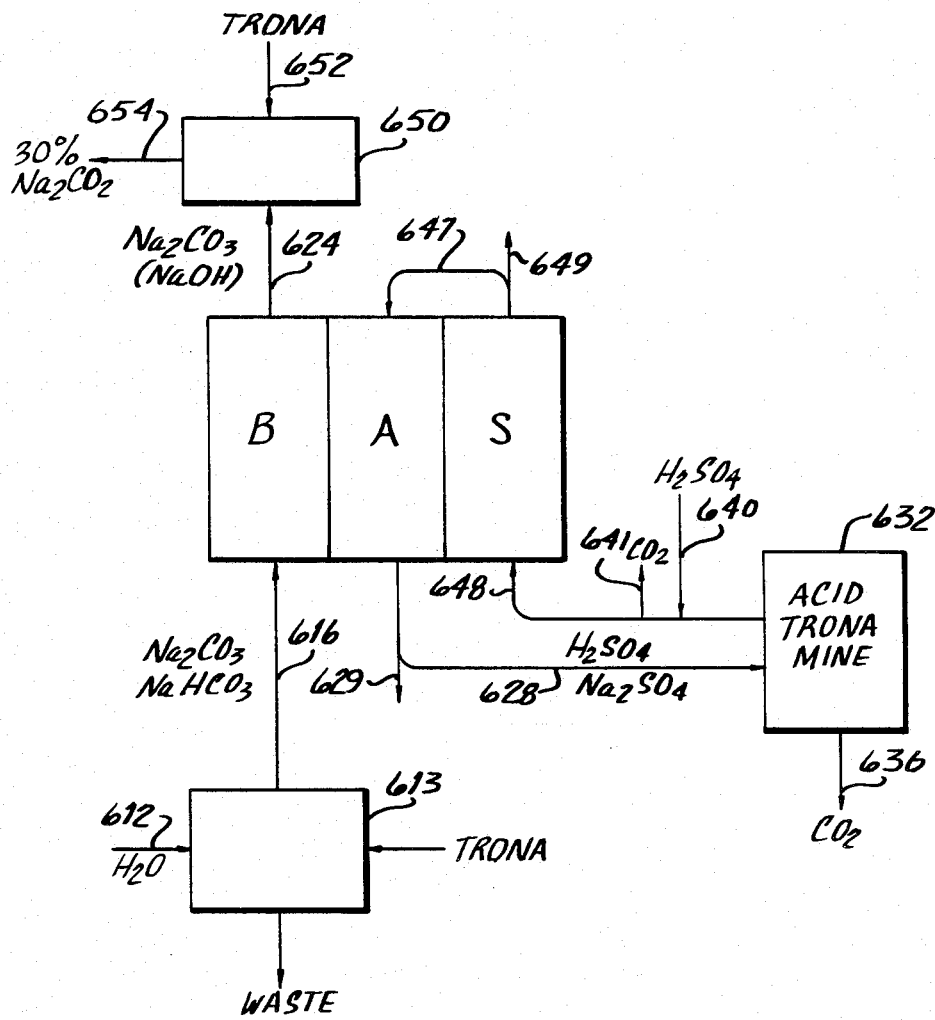
FIG. 6 illustrates a flow diagram of another preferred embodiment of the present invention of FIG. 5 using a three-compartment electrodialytic water splitter.
Figure 8:
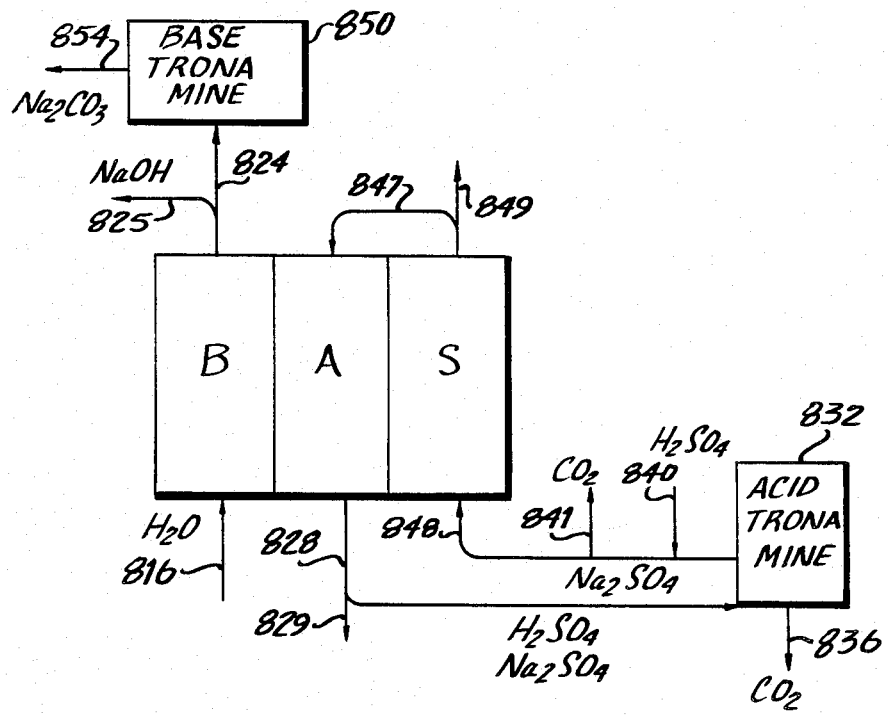
FIG. 8 illustrates a flow diagram of a preferred embodiment of the present invention of FIG. 7 using a three-compartment electrodialytic water splitter.

Another embodiment of our invention employs base solution mining of a subterranean trona deposit (hereinafter "base trona mine") and is illustrated in FIGS. 6 through 8. In this embodiment, about an 8% by weight sodium hydroxide solution may be fed into the mine to generate about a 10 to about 30% by weight, preferably about a 30% by weight, sodium carbonate solution. In addition, the effluent solution (reaction liquid) from the base trona mine may also contain some sodium bicarbonate which can be neutralized with, for example, sodium hydroxide withdrawn from the water splitter. Alternatively, effluent solution containing sodium bicarbonate may be fed to the base compartment of a two- or three-compartment electrodialytic water splitter. If the effluent solution contains a small amount of sodium hydroxide, the hydroxide may be converted to sodium carbonate by introducing carbon dioxide gas into the solution, the carbon dioxide having been recovered from, for example, the acidification step or, as illustrated in FIG. 7, the sodium hydroxide-containing solution and purified trona may be fed to an evaporator wherein concentrated sodium hydroxide is produced. The concentrated sodium hydroxide then may be recycled for base solution mining of trona or forwarded to the base compartment of the two or three-compartment electrodialytic water splitter.

As stated, the present invention may be operated with a two- or three-compartment electrodialytic water splitter. If a three-compartment electrodialytic water splitter is used, at least a portion of and preferably all of the output of the salt compartment would be introduced into the acid compartment such as illustrated in FIGS. 2, 6 and 8. If the two-compartment electrodialytic water splitter is to be employed, the acid and base compartments may be fed as shown in either FIG. 1 or 1a. The two-compartment electrodialytic water splitter illustrated in FIG. 1 may be sufficient under normal conditions, that is for producing 1–50% conversion of a metal salt to a monohydride acid, depending upon the degree of ionization of a monohydride acid. For producing at least about 1–5% HCl (a highly ionized acid) by conversion of 1M NaCl to about 0.01–0.05 molar HCl/about 0.99–0.95 molar NaCl, or at least about 25–50% $NaHSO_4$ (a partially ionized acid) by conversion of 1 molar $Na_2SO_4$ to about 0.25–0.50 $NaHSO_4$/about 0.75–0.50 molar $Na_2SO_4$, it may be advisable to use the alternate embodiment illustrated in FIG. 1a.

The two-compartment water splitter illustrated in FIG. 1 incorporates a plurality of cation 20 and bipolar ion exchange membranes 22 arranged in an alternating fashion to define alternating acid and base compartments between two electrodes 11 and 13. The construction of such electrodialysis stacks is well known and, for example, units are available commercially from Asahi Glass Co., 1-2, Marunochi 2-chome, ChiyodaKu, Tokyo, Japan; and Ionics, Inc., Watertown, Massachusetts. In addition, stacks which are suitable for electrolyte concentration such as the Asahi Model CU-IV, may also be used for the water splitter; however, the bipolar membrane used therein must be of a kind adaptable to water splitting. While the use of bipolar membranes is preferred because of the simplicity of equipment, the water splitting operation may be carried out by using a third compartment containing anions or cations incapable of passing through the anion and cation membranes on either side of the compartment as described, for example, in U.S. Pat. 3,704,218 and 3,705,846. This arrangement operates in place of and by the same principles as the bipolar membrane. In the illustrated two-compartment water splitter, water is converted into hydrogen and hydroxyl ion by bipolar membranes of the type described, for example, in U.S. Pat. 2,829,095 (which has reference to water splitting generally), in U.S. Pat. No. 4,024,043 (single film bipolar membrane), or in U.S. Pat. No. 4,116,889 (cast bipolar membrane).

The cation membranes useful in the process of the present invention may be weakly acidic or strongly acidic cation permselective membranes. Particularly useful strongly acidic cation membranes are Dupont's Nafion ® acidic fluorocarbon membranes, especially Nafion ® 110, 901, and 324; but other commercially available cation membranes may be used.

The current passed through the electrodialytic water splitter in conventional fashion is direct current of a voltage dictated by design and performance characteristics readily apparent to the skilled artisan and/or determined by routine experimentation.

The operation of the two-compartment electrodialytic water splitter of FIG. 1 is described herein. A direct current passes from the anode 11 to the cathode 13. Line 18 which contains $H_2O$, $Na_2SO_4$ and, optionally, some (i.e., 1–5% by weight) $H_2SO_4$ is fed to the acid compartments labeled A. In the acid compartments A, hydrogen ions $H^+$ from the bipolar membranes 22 are introduced. At the same time, $Na^+$ ions migrate from the acid compartments A to the base compartments B through the cation membranes 20. Since $H_2SO_4$ and $NaHSO_4$ are strongly acidic, the concentration of $H^+$ ions in the acid compartments A will increase as the solution therein becomes more acidic. This promotes the effective transport of $H^+$ ions (relative to $Na^+$ ions) across the cation membrane. Water or dilute NaOH (which may be supplied as recycled product via line 26) is fed via a line 16 to the base compartments B. With this cell arrangement, some $H^+$ formed in the acid compartments A will be lost to the base compartments B by transport through the cation membranes 20. $H^+$ ions reaching the base compartments B react with the hydroxide formed by electrodialytic water splitting in bipolar membranes 22 to produce $H_2O$ thereby lowering the concentration of NaOH removed from the base compartments B via a line 24. The composition of the reaction liquid product in the base compartment will, therefore, depend on the relative amounts of constituents in the product recycled via the line 26 from line 24, the water fed from the line 16 and the relative amount of $H^+$ diffused into the base compartments B. Normally, the liquid product comprises about 2–40% by weight and preferably 5–20% by weight NaOH and is removed via the line 24. The conversion of the water supplied by the line 16 may be accomplished in a single pass through the stack, by a feed and bleed apportionment method or by passing the solutions through a series of stacks so as to maximize the efficiency of the process.

The electrodialytic water splitter may be operated at any temperature between about 20° C. and 80° C., but more practically and conveniently between about 30° C. and 55° C. In the more preferred embodiment of the present invention, by employing aqueous sodium sulfate solution in the acid loop and by maintaining temperatures of at least about 40° C. to 55° C. in the electrodialytic stack, the overall current efficiency is improved by about 2%, compared to operating at temperatures less than about 40° C., e.g., about 35° C.

The two-compartment electrodialytic water splitter illustrated in FIG. 1a incorporates a plurality of unit cells each comprised of one bipolar membrane 22a and at least two cation exchange membranes, 20b and 20c, thereby forming alternating base, first acid compartment, $A_1$, and second acid compartment $A_2$, arranged in alternating fashion between two electrodes, 11a and 13a. The cation membranes 20b and 20d separating $A_1$ and $A_2$ may be low resistance, substantially non-porous but water-swollen, weak, mildly acidic or strongly acid cation membranes such as described in reference to FIG. 1 hereinbelow, or may even be uncharged membranes. These uncharged membranes are non-ion selective but anion and cation-permeable, and are substantially non-porous but water-swollen. Suitable uncharged membranes may be prepared by interpolymerizing a difunctional vinyl monomer, e.g., divinyl benzene with a non-ionic hydrophilic monomer, e.g., acrylamine such as described in copending U.S. patent application Ser. No. 490,946, filed May 2, 1983, to Chlanda et al. which is hereby incorporated by reference. Exemplary uncharged membranes include crosslinked polyvinyl alcohol membranes.

As illustrated in FIG. 1a, a direct current passes from the anode 11a to the cathode 13a. A solution in 18a and 18b which contains, for example, aqueous sodium sulfate is fed to the acid compartments $A_2$. Hydrogen ions are generated at bipolar membranes 22a and 22b in acid compartment $A_1$ and migrate into acid compartment $A_2$ by passage through cation membranes 20b and 20d. At the same time, sodium ions migrate from acid compartment $A_1$, through cation membranes 20b and 20d to acid compartment $A_2$. Simultaneously, sodium ions and hydrogen ions migrate from acid compartment $A_2$ through cation membranes 20a, 20c and 20e to base compartments B. A sodium sulfate solution, optionally containing sulfuric acid or even sodium hydroxide, is withdrawn from acid compartments $A_2$ via lines 19a and 19b and transferred via lines 23a and 23b to acid compartment $A_1$ wherein the hydrogen ion concentration is increased and an acidified sodium sulfate/sulfuric acid solution is withdrawn from acid compartment $A_1$ via lines 25a and 25b. By providing a second cation membrane 20b and 20d to define acid compartments $A_1$ and $A_2$ a more acidic salt solution is produced in the acid compartments $A_1$. With this arrangement, the amount of migration of hydrogen ions into the base compartment B is reduced as compared to the 2-compartment electrodialytic water splitter illustrated in FIG. 1 and, therefore, the overall current efficiency is increased.

There are several possible arrangements for performing the process of the present invention; the specific arrangement will depend on the composition of the aqueous solution of sodium ions obtained in the acidification step, the characteristics of the membranes available, the type of electrodialysis equipment available, the composition and purity of the basic sodium material, as well as the site of operation.

The basic process of the present invention using two-compartment electrodialytic water splitting is illustrated in FIG. 3. Water in a line 316 is fed to a base compartment B of a two-compartment electrodialytic water splitter which operates analogously to the two-compartment water splitter illustrated in FIG. 1. Sodium hydroxide solution, normally containing about 15–20% by weight sodium hydroxide, is withdrawn from the base compartments B via a line 324. At least a portion of the sodium hydroxide solution may be recycled via a line 326 to the line 316. The sodium hydroxide solution produced may be purified and concentrated, or may be reacted with a basic sodium material such as trona to form a concentrated solution of sodium carbonate. Water in a line 318 is fed to an acid compartment A to produce an acidified solution of sodium ions, preferably an aqueous solution comprising sodium sulfate and sulfuric acid which is withdrawn from the acid compartment A via a line 328. While the process described in reference to FIG. 3 employs the preferred aqueous solution of sodium sulfate and sulfuric acid in the acid loop, it is understood that an aqueous solution of sodium chloride and hydrochloric acid or sodium phosphate and phosphoric acid may also be used. At least a portion of the solution from the acid compartment A may be recycled via a line 330 back to the feed line 318. The remaining aqueous solution from the acid compartment A is forwarded to an acidification zone 332 for contact with basic sodium material fed via a line 334. The contact in the acidification zone 332 produces carbon dioxide removed via a line 336 and an aqueous solution of sodium ions, normally aqueous sodium sulfate solution, which is removed from the acidification zone 332 via a line 338. For sulfate solutions, sulfuric acid or sodium sulfate may conveniently be added to the line 338 via a line 340 to make-up for the sodium sulfate values remaining in the acidification zone 332 or to neutralize the sodium bicarbonate content in the line 338 (which produces $CO_2$ gas vented by a line 341). The product, a sodium sulfate-enriched solution, is forwarded to a purification zone 344 wherein impurities such as divalent cations (e.g. $Mg^{++}$) and insolubles are removed via a line 346. The purified sodium sulfate solution is removed from the purification zone 344 via a line 348 and forwarded to the acid compartment A. The purified sulfate solution may be introduced into the acid compartment A via the recycle line 330 or directly (not shown) into the line 318.

The three-compartment electrodialytic water splitter illustrated in FIG. 2 incorporates a plurality of cation 220a, 220b, bipolar 222 and anion exchange membranes 221 arranged in an alternating fashion between two electrodes 211 and 213 to provide alternating base B, acid A and salt S compartments that form an electrodialytic stack. The cation and bipolar ion exchange membranes employed in FIG. 2 are analogous to those described in connection with FIG. 1. The anion exchange membranes useful in the 3-compartment electrodialytic water splitter may be weakly basic or strongly basic anion permselective membranes such as commercially available from Asahi Glass Co., Asahi Chem. Industry Corp. or as described in U.S. Pat. No. 4,116,889; but other commercially available anion membranes may used. A particularly useful anion exchange membrane is the anion membrane 204-PUZL-386 available from Ionics, Inc., Watertown, Massachusetts. The liquid comprising water is fed to the base compartment via a line 216. Sodium ions migrate to the base compartment B through cation membrane 220a and hydroxide ions are supplied to the base compartment B by bipolar membrane 222 to produce aqueous base which is withdrawn via a line 224. A portion of the aqueous base may be recycled through the base compartment B via a line 226. The salt compartment S is supplied with, for example, a sodium sulfatecontaining solution via a line 248. The salt compartment solution is withdrawn via a line 247 and supplied to the acid compartment A. In acid compartment A, sulfate ions (having migrated through anion membrane 221 from the salt compartment S) combine with hydrogen ions produced by bipolar membrane 222 to form an acidified solution, normally comprising sodium sulfate and sulfuric acid. The acidified solution is withdrawn via a line 228 and forwarded in the process as described supra or removed via a line 229.

FIG. 4 illustrates a preferred embodiment of our process using the threecompartment electrodialytic water splitter described above with reference to FIG. 2. In FIG. 4, a liquid comprising water is introduced via line 416 into base compartment B wherein sodium hydroxide is produced and withdrawn via line 424. Normally, at least a portion of the sodium hydroxide withdrawn from the base compartment is recycled via line 426 to feed line 416. The aqueous solution of sodium ions, normally sodium sulfate, is introduced via line 448 into salt compartment S, withdrawn via line 449 and forwarded via line 447 to acid compartment A wherein an acidified solution of aqueous sodium ions is formed, normally an aqueous solution comprising sodium sulfate and sulfuric acid, and is removed from acid compartment A via line 428. While at least a portion of the aqueous solution withdrawn from the salt compartment may be removed via line 449, normally all of the material withdrawn from the salt solution is forwarded to the acid compartment. Similarly, while a portion of the aqueous solution of hydrogen and sodium ions may be removed via line 429, normally all of the acidified solution is forwarded via line 428 to acidification zone 432 for contact with a basic sodium material such as trona supplied thereto via a line 434. In acidification zone 432, the acidified solution reacts with the solid sodium material (such as trona) to form carbon dioxide (removed via line 436) and the aqueous solution of sodium ions. Sodium sulfate or sulfuric acid may be added to line 448 via line 440 to make-up for sulfate remaining in the acifidication zone 432. Purification of the aqueous solution of sodium ions, preferably sodium sulfate, is not shown but is analogous to that described in reference to FIG. 3 hereinabove.

Figure 5:
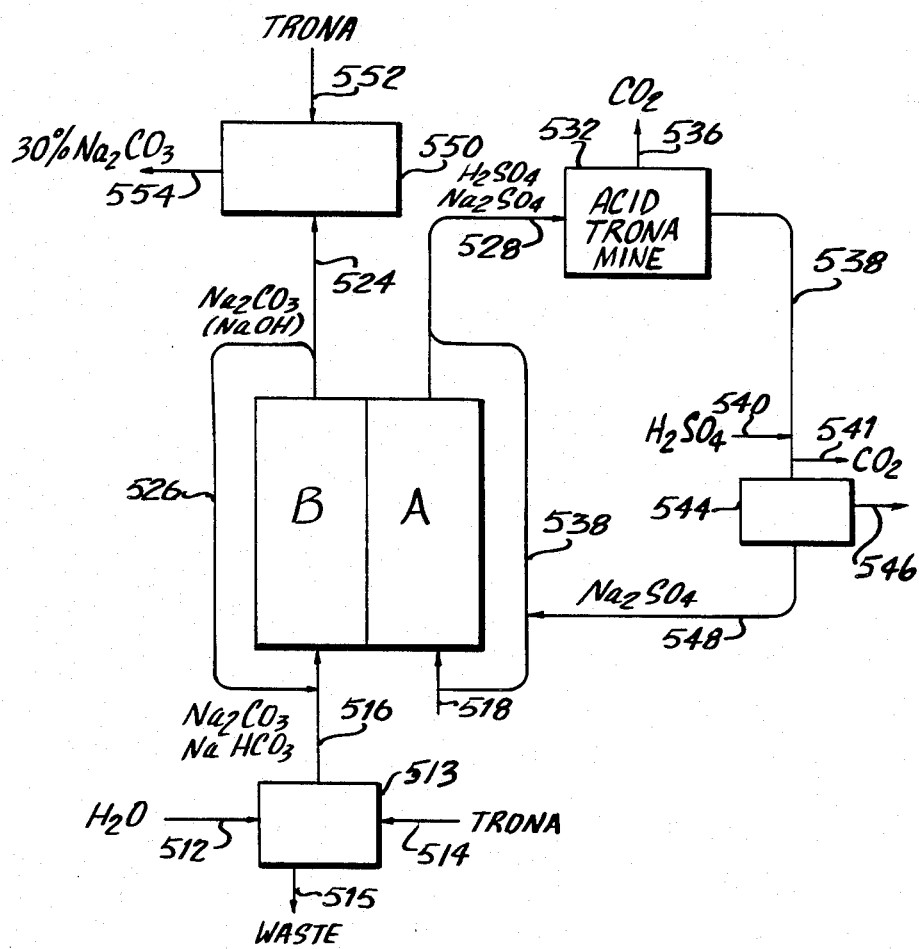
FIG. 5 illustrates a flow diagram of a preferred embodiment of the present invention using a two-compartment electrodialytic water splitter for acid solution mining of subterranean trona deposits.

A preferred embodiment of the present invention utilizing the two-compartment electrodialytic water splitter for acid solution mining of a subterranean trona deposit (hereinafter "acid trona mine") is illustrated in FIG. 5. An aqueous solution of sodium ions which may contain sulfuric acid is fed to acid compartment A via line 518, and a solution comprising aqueous sulfuric acid and sodium sulfate is removed from acid compartment A via line 528 for forwarding to acid trona mine 532. The reactions in the trona mine 532 are analogous to those illustrated hereinabove for a reaction of acidified solution with base mineral. The carbon dioxide formed by the acid solution mining is removed via line 536. The aqueous solution of sodium ions normally containing sodium sulfate and optionally containing sodium carbonate and/or sodium bicarbonate is removed from the mine 532 via line 538. Sulfuric acid and/or sodium sulfate is added via line 540 to make-up for sulfate values left in the acid trona mine 532. Normally, when line 538 contains sodium bicarbonate, sulfuric acid or a solution of sodium sulfate and sulfuric acid removed from acid compartment A is fed via line 540 to react with the sodium bicarbonate to form an aqueous solution of sodium ions which is forwarded to a purification zone 544 wherein any carbon dioxide which is formed is removed via line 541. In purification zone 544, divalent cations such as calcium and magnesium as well as organic impurities and insolubles, which may interfere with the operation of the electrodialytic water splitter, are removed via line 546. An aqueous solution comprising sodium sulfate is removed from purification zone 544 via line 548 for forwarding to acid compartment A, either through acid line 530 or through feed line 518. Water in line 512 is fed to a reaction zone 513 for contacting with a solid basic sodium material such as trona fed thereto via line 514. A solution of sodium carbonate and sodium bicarbonate is removed from 513 via line 516 for forwarding to base compartment B wherein the sodium bicarbonate values are converted to sodium carbonate. A solution comprising aqueous sodium carbonate and, optionally, sodium hydroxide is removed from base compartment B via line 524. Preferably, at least a portion of the sodium carbonate-containing solution is recycled via line 526 to line 516. The sodium carbonate-containing solution in line 524 is forwarded to a reaction zone 550 for contact with crude trona ore to form an aqueous solution of sodium carbonate, in the range of about 10 to about 30% by weight sodium carbonate and normally about 30% by weight, which is removed from 550 via line for 554. The aqueous sodium carbonate solution from line 554 is purified by conventional techniques such as filtration and multiple effect evaporation to form soda ash, that is, anhydrous sodium carbonate.

An alternate preferred embodiment of the invention utilizing a threecompartment electrodialytic water splitter is illustrated in FIG. 6. The design of the three-compartment electrodialytic water splitter is the same as described with reference to FIG. 2. An aqueous solution comprising sodium sulfate (obtained from an acid trona mine) is supplied via line 648 to the salt compartment S. The salt compartment solution is removed via a line 649 and supplied to the acid compartment A via line 647. A solution comprising aqueous sulfuric acid and sodium sulfate is removed from the acid compartment via line 629, and at least a portion thereof is supplied to an acid trona mine 632 via line 628. The carbon dioxide formed by the acid solution mining is removed from the mine via line 636 and the aqueous solution from the acid trona mine (which may also contain the sodium carbonate and/or sodium bicarbonate) is removed via line 648. Makeup sulfuric acid and/or sodium sulfate is added via line 840 to replace sulfur values retained in the mine. Line 841 is provided to vent any $CO_2$ formed in the line 848 after the addition of the makeup sulfur values. Water in line 612 is fed to a reaction zone 613 for contact with, for example, trona to produce a solution of carbonate and bicarbonate. The solution of carbonate and bicarbonate is supplied via line 616 to the base compartment B to convert the bicarbonate to carbonate and to form base. The carbonate and hydroxide product solution in the base compartment B is removed via a line 624 and forwarded to reaction zone 650 for contact with crude trona to produce about a 30 percent by weight carbonate solution which is removed via a line 654. The aqueous carbonate solution can thus be purified by conventional techniques to form soda ash.

Another alternative preferred embodiment of the present invention employing both acid and base solution mining of trona is illustrated in FIG. 7, utilizing a two-compartment electrodialytic water splitter. The operation of the twocompartment electrodialytic water splitter illustrated in FIG. 6 is analogous to the water splitter illustrated in FIGS. 1 and 3. Water in line 718 which may contain aqueous sodium ions is fed to line 748 which preferably contains aqueous sodium sulfate. The resultant solution in line 748 is introduced into acid compartment A. An aqueous solution comprising sodium sulfate and sulfuric acid is removed from acid compartment A via line 728. The aqueous solution of sulfuric acid and sodium sulfate in line 728 normally contains about 1 to about 15% by weight, preferably about 5 to about 10% by weight, sulfuric acid and from about 5 to about 30% by weight, preferably about 15 to 25% by weight, sodium sulfate. Optionally, additional sulfuric acid may be added to line 728 via line 729. The aqueous solution of sodium sulfate and sulfuric acid in line 728 is forwarded to acid trona mine 732. The reactions in the acid trona mine 732 between sulfuric acid and trona are exactly those illustrated in the acidification step hereinabove with reference to FIG. 6. Carbon dioxide is removed from line 732 via line 736 and an aqueous solution, normally containing sodium sulfate which optionally may contain sodium carbonate and/or sodium bicarbonate, is removed from the acid trona mine 732 via line 738. Sulfuric acid and/or sodium sulfate may be added via line 740 to line 738 to make-up for the sulfate values which may have remained in the acid trona mine with any produced $CO_2$ being removed via line 741. Purification zone 744 is provided to remove divalent cation such as magnesium and calcium as well as organics and insoluble materials which may interfere with the operation of the electrodialytic water splitter. The purified aqueous solution of sodium sulfate is removed from 744 via line 747 for forwarding to acid zone A. Additional make-up sodium sulfate may be added to line 747 via line 745. Water in line 712 is fed via line 716 (which may also contain base) to base compartment B of the two-compartment water splitter, and an aqueous solution of sodium hydroxide is removed from base compartment B via line 724. At least a portion of the sodium hydroxide solution produced in base compartment B is forwarded via line 724 to base trona mine 750. Solution mining of subterranean trona deposits by use of aqueous sodium hydroxide is disclosed in U.S. Pat. No. 3,184,287 (Gancy) and in U.S. Pat. No. 3,952,073 (Kube). The sodium hydroxide reacts with the sodium bicarbonate/sodium carbonate mineral to form an aqueous solution of sodium carbonate which may contain excess sodium hydroxide. Solution is removed from the base trona mine 750 via line 754 and forwarded to purification zone 756 for removal of insolubles and cations which may interfere with the operation of the water splitter. Carbon dioxide gas may be added via line 760 to line 758 and sodium hydroxide removed from base line 724 via line 725 is added to line 758 to produce about a 30% by weight sodium carbonate solution. The sodium carbonate solution is forwarded via line 762 to a triple effect evaporator 764 (which may be of any convenient design, well known to those skilled in the art). Sodium carbonate monohydrate is removed from the multiple effect evaporator 764 via line 768 and forwarded to a dryer 770 wherein anhydrous sodium carbonate (soda ash) is formed and removed via line 772. The effluent from the evaporator 764, normally containing sodium hydroxide and/or sodium carbonate values, is removed via line 766 and at least a portion thereof is forwarded via line 765 to the base trona mine 750. The remainder of this sodium hydroxide/sodium carbonate solution in line 766 is forwarded via line 767 to line 716 for supply to the base compartment B. Recycle loops for the base compartment and acid compartment (not shown) may be added if desired.

Another preferred embodiment of the present invention involving both acid and base solution mining of subterranean trona deposits is illustrated in FIG. 8 utilizing a three-compartment water splitter. The operation of the three-compartment electrodialytic water splitter is analogous to that described in reference to FIGS. 2 and 4. An aqueous solution of sodium sulfate and sulfuric acid is removed from acid compartment A via line 828 for forwarding to acid solution mine 832. The reactions in the acid trona mine 832 are analogous to the reactions in acid trona mine 732 (FIG. 7). The aqueous solution of sodium ions is removed from acid trona mine 832 via line 848. Make-up sulfuric acid and/or sodium sulfate may be added via line 840 to make-up for the sulfate values left in trona mine 832 and to convert the sodium bicarbonate into sodium sulfate and carbon dioxide which is removed via line 841. The aqueous solution of sodium sulfate is forwarded after purification (not shown) via line 848 to salt compartments S and removed therefrom via line 847 for forwarding to acid compartment A. Water in line 816 is introduced into base compartment B and an aqueous solution of sodium hydroxide is removed from the base compartment B via line 824. A portion of the base solution may be removed via line 825 and the remainder with aqueous $Na_2SO_4/H_2SO_4$ supplied via line 931 to produce $Na_2SO_4$ and $CO_2$ (removed via line 939). Make-up water in line 944 and make-up $Na_2SO_4$ in line 942 are added to zone 940. The neutralized, filtered effluent (29.1% $Na_2SO_4$) is forwarded from zone 940 via line 948 to the acid compartment A. Water is added via line 916 to base compartment B. An 18% aqueous NaOH solution containing 0.3% $Na_2SO_4$ which is produced in base compartment B is forwarded via line 924 to quadruple effect evaporator 950 operated in a standard way with $10.5 \times 10^2$ kPa steam added via line 951. Water is removed via line 953 and 50% NaOH is removed via line 952. $Na_2SO_4$ is removed via line 946 and forwarded to zone 940.

Figure 9:
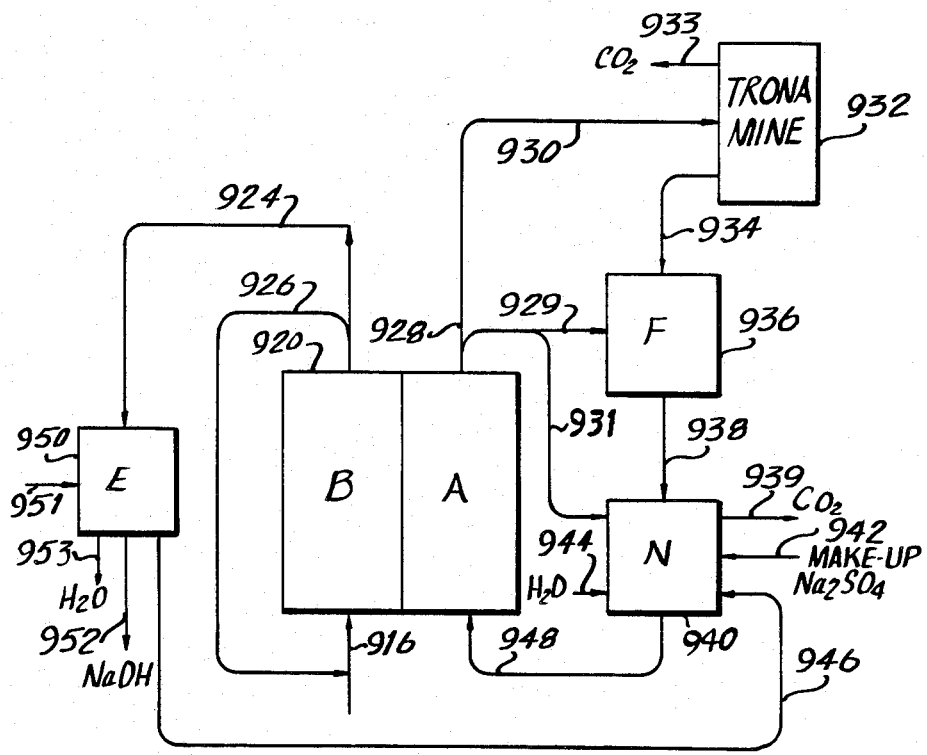
FIG. 9 illustrates a flow diagram of another preferred embodiment of the present invention using a two-compartment electrodialytic water splitter for acid solution mining of a subterranean deposit of trona and for production of 50% by weight NaOH.

The mass flow for streams in FIG. 9 is given in Table 1 below to help clarify the operation of the process shown in FIG. 9. These figures do not necessarily reflect optimum or realizable conditions for the operation of the process.

TABLE 1

| Stream | $Na_2SO_4$ | $H_2SO_4$ | NaOH | $Na_3CO_3$ | $NaHCO_3$ | $CO_2$ | $H_2O$ |
|---|---|---|---|---|---|---|---|
| 916 | | | | | | | 290034 |
| 924[2] | 1808 | | 107484 | | | | 197484 |
| 928 | 435243 | 131673 | | | | | 1283480 |
| 929[3] | 77157 | 23343 | | | | | 227536 |
| 930 | 358086 | 108330 | | | | | 1055944 |
| 932[4,5] | | | | 95062 | 75320 | | 34613 |
| 933 | | | | | | 52000 | |
| 934 | | | | | | 20952 | |
| 944 | | | | | | | 187091 |
| 946 | 1378 | | | | | | |
| 948 | 627845 | | | | | | 1529650 |
| 952[6] | 430 | | 107484 | | | | 107054 |
| 953 | | | | | | | 380387 |

Footnotes to Table 1
[1]All streams are parts by weight
[2]$Na_2SO_4$ transferred from A to B
[3]$Na_2SO_4/H_2SO_4$ solution fed to neutralization zone 940 and filter 936.
[4]Composition of trona ore dissolved in mine 932 at 20° C.
[5]Composition of solution left in mine 932 is 3587 parts of $Na_2SO_4$, 277 parts of $NaHCO_3$ and 7756 parts of $H_2O$ at 36° C.
[6]Represents a 50% by weight NaOH solution forwarded to a base trona mine 850. The reactions in the base trona mine 850 are exactly analogous to those described for base trona mine 750 (FIG. 7). An aqueous solution of sodium carbonate, which may also contain sodium hydroxide, is removed from the base trona mine 850 via line 854. The purification of the aqueous sodium carbonate solution (which may contain sodium hydroxide) in line 854 and production of soda ash are processes analogous to those described hereinabove with reference to FIG. 7.

The invention will be further illustrated by reference to the following examples, the details of which should not be construed as limiting the invention except as may be required by the appended claims.

EXAMPLE 1

This example describes an alternative embodiment of the present invention illustrated in FIG. 9. A two-compartment electrodialytic water splitter 920 is operated at 45° C. to produce an aqueous solution containing 23.5% $Na_2SO_4/7.1\%$ $H_2SO_4$ which is removed from the acid compartment A via lines 928 and 930 for injection into acid trona mine 932. The effluent from the mine 932 (30.8% $Na_2SO_4/0.24\%$ $NaHCO_3$) is forwarded via line 934 to a filter 936 wherein the pH is adjusted by addition of a portion of the aqueous $Na_2SO_4/H_2SO_4$ contained in line 929 (removed from line 928). The filtered effluent is removed via line 938 and forwarded to neutralization zone 940 wherein the $NaHCO_3$ is reacted

EXAMPLE 2

The description and composition of the points on the phase diagram for the $NaHCO_3$—$Na_2CO_3$—$Na_2SO_4$—$H_2O$ system illustrated in FIG. 10 are given in Table 2 below in parts by weight. From a comparison of FIG. 10 with Table 2, the above-described system exhibits a high degree of sodium solubility in water at 35°-38° C. When the two- and three-compartment electrodialytic water splitters used in the present invention are preferably operated at 45°-55° C., the waste heat from the water splitters can be used to operate the trona solution mining streams in the preferred 35°- 38° C. temperature range thereby achieving considerable energy integration.

TABLE 2

| Point[1] | Solid Phase[2] | Composition[3] | | |
|---|---|---|---|---|
| | | $NaHCO_3$ | $Na_2CO_3$ | $Na_3SO_4$ |
| A | $NaHCO_3$ | 10.6 | 0 | 0 |
| B | $C_14$ | 0 | 33.7 | 0 |
| C | $S_o5$ | 0 | 0 | 33.2 |
| D | $C_14$ + trona | 0.6 | 32.5 | 0 |
| E | trona + Bicarbonate | 4.7 | 17.3 | 0 |
| F | $C_14$ + $B_u6$ | 0 | 28.7 | 5.98 |
| G | $B_u6$ + $S_o5$ | 0 | 14.3 | 20.6 |
| H | $S_o5$ + | 2.43 | 0 | 30.88 |
| I | $C_14$ + $B_u6$ + trona | 0.44 | 29.49 | 4.49 |
| J | $B_u6$ + trona + $S_o5$ | 1.5 | 12.13 | 21.31 |
| K | trona + $S_o5$ + | 2.43 | 9.0 | 22.10 |

TABLE 2-continued

| Point[1] | Solid Phase[2] | Composition[3] | | |
|---|---|---|---|---|
| | | NaHCO$_3$ | Na$_2$CO$_3$ | Na$_3$SO$_4$ |
| L | Bicarbonate NaHCO$_3$ | | Solid trona | |
| M | S$_o$5 + Bicarbonate | 2.43 | 3.06 | 27.91 |

[1] Points on FIG. 10 Solid Phases in FIG. 10 Weight %
[4] $C_l$ = Na$_2$CO$_3$.H$_2$O
[5] $S_o$ = Na$_2$SO$_4$
[6] $B_u$ = Na$_2$CO$_3$.2Na$_2$SO$_4$

We claim:

1. A process for converting basic sodium material into a liquid comprising aqueous hydrogen ions and a liquid comprising aqueous sodium base which comprises:
    (a) contacting basic sodium material with a liquid comprising aqueous hydrogen ions for a time sufficient to produce a reaction liquid comprising aqueous sodium ions and being substantially free of CO$_3$= values;
    (b) introducing the reaction liquid and a liquid comprising water into separate compartments of an electrodialytic water splitter;
    (c) passing direct current through said electrodialytic water splitter to produce a reaction liquid product comprising aqueous hydrogen ions and a liquid product comprising an aqueous sodium base;
    (d) withdrawing reaction liquid product from the electrodialytic water splitter; and
    (e) supplying at least a portion of the withdrawn reaction liquid product for contact with the basic sodium material.

2. The process of claim 1 wherein the electrodialytic water splitter is a two-compartment electrodialytic water splitter comprising at least one acid compartment and at least one base compartment, and wherein the reaction liquid is introduced into an acid compartment of said two-compartment electrodialytic water splitter and the liquid comprising water is introduced into a base compartment of said two-compartment electrodialytic water splitter.

3. The process of claim 2 wherein the acid and base compartments of the two-compartment electrodialytic water splitter are defined by alternating cation and bipolar membranes, the acid compartment being defined by a cation membrane and a cation permselective face of a bipolar membrane, and the base compartment being defined by a cation membrane and an anion permselective face of a bipolar membrane.

4. The process of claim 1 wherein the electrodialytic water splitter is a three-compartment electrodialytic water splitter comprising at least one base compartment, at least one acid compartment and at least one salt compartment, and wherein the liquid comprising water is fed to the base compartment, the reaction liquid is fed to the salt compartment, and at least a portion of the reaction liquid in the salt compartment is withdrawn therefrom and transferred to the acid compartment.

5. The process of claim 4 wherein the base, acid and salt compartments of the three-compartment electrodialytic water splitter are defined by alternating cation, bipolar and anion membranes, the base compartment being defined by a cation membrane and an anion permselective face of a bipolar membrane, the acid compartment being defined by a cation face of a bipolar membrane and an anion membrane, and the salt compartment being defined by an anion membrane and a cation membrane.

6. The process of claim 1 wherein the basic sodium material comprises at least one of sodium carbonate and sodium bicarbonate.

7. The process of claim 1 wherein the basic sodium material comprises trona.

8. The process of claim 1 wherein the basic sodium material is dry-mined trona and contacting occurs above ground.

9. The process of claim 1 wherein contacting occurs in a subterranean deposit of trona as a solution mining step.

10. The process of claim 1 wherein the liquid comprising aqueous hydrogen ions is an aqueous solution comprising Na$_x$H$_{2-x}$SO$_4$, Na$_x$H$_{3-x}$PO$_4$, HCl or mixtures thereof, and wherein x= 0 to 2.

11. The process of claim 1 wherein the liquid comprising water further comprises at least one of sodium carbonate and sodium bicarbonate.

12. The process of claim 11 wherein the liquid product comprises aqueous sodium carbonate and aqueous sodium hydroxide.

13. The process of claim 1 wherein the liquid product comprises aqueous sodium hydroxide, wherein the basic sodium material comprises at least one of sodium carbonate and sodium bicarbonate and contact thereof with the basic sodium material occurs for a time sufficient to produce an aqueous solution comprising about 10 to about 30 weight percent sodium carbonate.

* * * * *